(12) United States Patent
Wang

(10) Patent No.: US 11,556,838 B2
(45) Date of Patent: Jan. 17, 2023

(54) EFFICIENT DATA RELATIONSHIP MINING USING MACHINE LEARNING

(71) Applicant: SAP SE, Walldorf (DE)

(72) Inventor: Kefeng Wang, Wiesloch (DE)

(73) Assignee: SAP SE, Walldorf (DE)

( * ) Notice: Subject to any disclaimer, the term of this patent is extended or adjusted under 35 U.S.C. 154(b) by 1014 days.

(21) Appl. No.: 16/243,845

(22) Filed: Jan. 9, 2019

(65) Prior Publication Data
US 2020/0219006 A1    Jul. 9, 2020

(51) Int. Cl.
*G06N 20/00* (2019.01)
*G06F 16/2458* (2019.01)

(52) U.S. Cl.
CPC ......... *G06N 20/00* (2019.01); *G06F 16/2465* (2019.01)

(58) Field of Classification Search
CPC ....... G06N 20/00; G06N 5/04; G06F 16/2465
USPC ......................................................... 706/12
See application file for complete search history.

(56) References Cited

U.S. PATENT DOCUMENTS

| | | | | |
|---|---|---|---|---|
| 6,611,829 | B1 * | 8/2003 | Tate | G06F 16/3346 707/961 |
| 6,651,049 | B1 * | 11/2003 | Agrawal | G06F 16/2465 707/999.102 |
| 10,705,812 | B2 * | 7/2020 | Seetharaman | G06Q 10/0637 |
| 2012/0323674 | A1 * | 12/2012 | Simmons | G06Q 30/0249 705/14.41 |
| 2013/0204830 | A1 * | 8/2013 | Franke | G06F 16/21 706/47 |
| 2014/0337271 | A1 * | 11/2014 | Cox | G06Q 40/00 706/47 |
| 2020/0218994 | A1 * | 7/2020 | Kobayashi | G06N 5/025 |

OTHER PUBLICATIONS

T. Rolfsnes, L. Moonen, S. Di Alesio, R. Behjati and D. Binkley, "Improving Change Recommendation using Aggregated Association Rules," 2016 IEEE/ACM 13th Working Conference on Mining Software Repositories (MSR), 2016, pp. 73-84. (Year: 2016).*
J. Li, T. D. Le, L. Liu, J. Liu, Z. Jin and B. Sun, "Mining Causal Association Rules," 2013 IEEE 13th International Conference on Data Mining Workshops, 2013, pp. 114-123, doi: 10.1109/ICDMW. 2013.88. (Year: 2013).*
S. Fu and B. Shen, "Code Bad Smell Detection through Evolutionary Data Mining," 2015 ACM/IEEE International Symposium on Empirical Software Engineering and Measurement (ESEM), 2015, pp. 1-9, doi: 10.1109/ESEM.2015.7321194. (Year: 2015).*

* cited by examiner

*Primary Examiner* — Stephen S Hong
*Assistant Examiner* — Broderick C Anderson
(74) *Attorney, Agent, or Firm* — Klarquist Sparkman, LLP

(57) ABSTRACT

Techniques and solutions are described for determining association rules using a machine learning technique on a subset of data to which the association rules might apply, and from which they can be determined. In particular, association rules are determined by tracking changes to attribute values of data objects having a type. The changed attribute value can be used as a consequent in an association rule. Values of other attributes of data objects having the changed attribute value can be used as antecedents in association rules. Values used in antecedents can be constrained, such as by limiting values to those associated with scope attributes or values satisfying a threshold occurrence frequency. In some cases, determined association rules can be automatically implemented, such as to process input or stored data for data objects of the type.

20 Claims, 11 Drawing Sheets

| | Antecedent $A_1$ | Antecedent $A_2$ | Antecedent $A_3$ | Antecedent $A_4$ | Consequent $B_1$ | Consequent $B_2$ | Consequent $B_3$ |
|---|---|---|---|---|---|---|---|
| 248a | $D=V_d$ 256a | | | | | | |
| 248b | $D=V_d$ 256b | $E=V_e$ 256b | | | $A=V_a$ 252a | | |
| 248c | $D=V_d$ 256c | | $F=V_f$ 256c | | $A=V_a$ | | |
| 248d | $D=V_d$ 256d | | | $C=V_c$ 256d | $A=V_a$ | | |
| 248e | $D=V_d$ 256e | $E=V_e$ 256e | $F=V_f$ 256e | | $A=V_a$ | | |
| 248f | $D=V_d$ 256f | $E=V_e$ 256f | | $C=V_c$ 256f | $A=V_a$ | | |
| 248g | $D=V_d$ 256g | | $F=V_f$ 256g | $C=V_c$ 256g | $A=V_a$ | | |
| 248h | $D=V_d$ 256h | $E=V_e$ 256h | $F=V_f$ 256h | $C=V_c$ 256h | $A=V_a$ | $B=V_b$ 252b | |
| 248i | $D=V_d$ 256i | $E=V_e$ 256i | | | $A=V_a$ | $B=V_b$ | |
| 248j | $D=V_d$ 256j | | $F=V_f$ 256k | | $A=V_a$ | $B=V_b$ | |
| 248k | $D=V_d$ 256k | | | $C=V_c$ 256l | $A=V_a$ | $B=V_b$ | |
| 248l | $D=V_d$ 256l | $E=V_e$ 256m | $F=V_f$ 256m | | $A=V_a$ | $B=V_b$ | |
| 248m | $D=V_d$ 256m | $E=V_e$ 256n | | $C=V_c$ 256n | $A=V_a$ | $B=V_b$ | |
| 248n | $D=V_d$ 256n | | $F=V_f$ 256o | $C=V_c$ 256o | $A=V_a$ | $B=V_b$ | |
| 248o | $D=V_d$ 256o | $E=V_e$ 256p | $F=V_f$ 256p | $C=V_c$ 256p | $A=V_a$ | $B=V_b$ | |
| 248p | $D=V_d$ 256p | | | | | | |

FIG. 3

EFFICIENT DATA RELATIONSHIP MINING USING MACHINE LEARNING

FIELD

The present disclosure generally relates to analyzing relationships between data. Particular implementations relate to machine learning techniques for efficient, automated determination of such relationships based on particular subsets of available data in a database.

BACKGROUND

As computers become more pervasive, opportunities exist for determining relationships between data that may be generated or acquired. For example, relationships between data, which can be expressed as rules, can be used to determine whether particular types of data are associated with each other. These rules can be used for a variety of purposes, including optimizing various processes, or to obtain insights that might be exploited in other ways. However, problems can arise when analyzing large data sets, particularly in specialized fields.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for determining association rules using a machine learning technique on a subset of data to which the association rules might apply, and from which they can be determined. In particular, association rules are determined by tracking changes to attribute values of data objects having a type. The changed attribute value can be used as a consequent in an association rule. Values of other attributes of data objects having the changed attribute value can be used as antecedents in association rules. Values used in antecedents can be constrained, such as by limiting values to those associated with scope attributes or values satisfying a threshold occurrence frequency. In some cases, determined association rules can be automatically implemented, such as to process input or stored data for data objects of the type.

In one aspect, a method is provided of using a machine learning technique to determine association rules based on changes to attributes of data object instances of a data object type. A first plurality of attributes is retrieved that are associated with a plurality of data objects of a first type. A data object includes multiple attributes, at least a portion of the multiple attributes being in the first plurality of attributes. An attribute is associated with a common identifier among the first plurality of data objects. The plurality of data objects comprises respective values for the attribute.

A first data object of the plurality of data objects is determined where an attribute value was changed to a first value for a first attribute. An identifier of the first attribute is determined. A second data object of the first plurality of data objects is determined where a value associated with the first attribute was changed to the first value. An identifier of at least a second attribute associated with the first and second data objects is determined. A second value for the second attribute associated with the first data object and a third value for the second attribute associated with the second data object are retrieved.

At least a first association rule is constructed. The at least a first association rule has the first attribute identifier and the first value as a consequent and the second attribute and the second or third value as an antecedent. The at least a first association rule is evaluated using a second plurality of data objects, which can include at least a portion of the first plurality of data objects, to provide at least a first evaluation metric value for at least a first evaluation metric. The at least a first evaluation metric value is compared with at least a first threshold defined for the at least a first evaluation metric.

It is determined that the at least a first evaluation metric value satisfies the at least a first threshold. The at least a first association rule is implemented. First data input for a data object of the first type is received. The first data input is processed using the at least a first association rule.

In another aspect, a method is provided that can be performed by a machine learning association rule determination tool. A change log is retrieved that includes a plurality of data value changes for a first plurality of instances of a data object type. The data object type includes a plurality of attribute types, where the data value changes are associated with at least a first attribute type of the plurality of attribute types. For the at least a first attribute type, a second plurality of data objected instances, selected from the first plurality of data object instances, are determined having a data value change for the at least a first attribute type where the change is to a common value.

A plurality of scope attributes is determined that are defined for the plurality of attribute types of the data object type. Values for the plurality of scope attribute are retrieved from the second plurality of data object instances. A most common value from the retrieved values is determined for the plurality of scope attributes. For respective scope attributes of the plurality of scope attributes, an occurrence frequency of a respective most common value for a respective scope attribute is determined.

For scope attributes of the plurality of scope attributes satisfying a threshold occurrence frequency, a plurality of association rules is constructed. One or more scope attributes satisfying the threshold are present in a respective association rule as rule antecedents and the common attribute value of the at least a first attribute type is present in the respective rule as a consequent. The plurality of association rules is verified using a second plurality of data object instances, which can include at least a portion of the first plurality of data object instances.

In a further aspect, a method is provided for implementing a machine learning process for determining association rules. At least a first attribute of a data object is determined that has a changed attribute value compared with a reference time. A plurality of data object instances having the changed attribute value are determined. A plurality of common attribute values for data object instances of the plurality of data object instances having the changed attribute value are determined. A plurality of association rules is defined. The plurality of association rules includes the at least the first attribute as a consequent of a given association rule and one or more of the common attribute values as antecedents of a given association rule.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 2 and 3 illustrate example data structures that can be used in determining association rules using attribute value changes of data objects.

DETAILED DESCRIPTION

EXAMPLE 1

Overview

Figure 1:
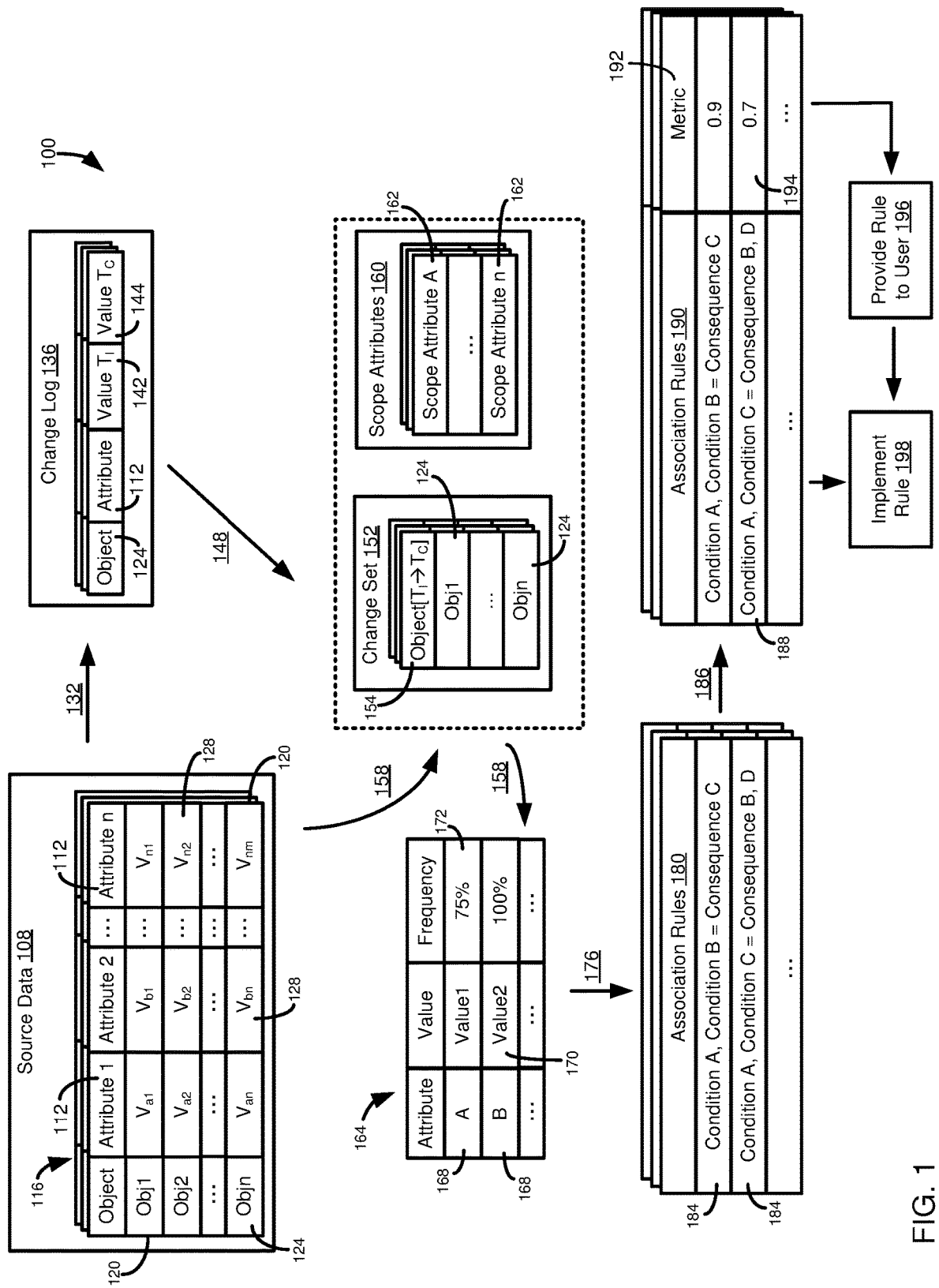
FIG. 1 is a schematic diagram illustrating a data processing flow for determining association rules via machine learning.

As computers become more pervasive, opportunities exist for determining relationships between data that may be generated or acquired. For example, relationships between data, which can be expressed as rules, can be used to determine whether particular types of data are associated with each other. These rules can be used for a variety of purposes, including optimizing various processes, or to obtain insights that might be exploited in other ways.

For example, a user may analyze rules to determine that they provide an indication or test of data quality (e.g., the rules can be used to define validation checks), for predictive purposes, and to uncover relationships that may be used for a variety of purposes, including improving performance and efficiency. In a particular aspect, relationships between particular attributes, or attribute values, of one or more relational database tables can be used to optimize database operations, such as by partitioning data to optimize database operations, such as select and join operations (e.g., reducing a number of multi-node selects or joins, or determine optimized paths between relations) or simplifying database transaction management (e.g., by reducing a number of two-phase commit operations).

Problems can arise when analyzing large data sets, particularly in specialized fields. For example, if a large data set is analyzed, a large number of rules may be generated. Many of the rules may not provide useful information, and it can be time consuming to determine which rules are of interest and which are not.

The present disclosure provides technologies that can be used to discover rules that define relationships between data elements. A rule mining system can also be used to track whether previously implemented rules are still valid. Previously implemented rules can be reevaluated periodically, and a notification or action taken if performance indicators for the rule fall below particular thresholds. If rules are no longer sufficiently accurate, various actions can be taken, including disabling the rules or initiating a rule mining process to determine a new, more accurate rule to replace the inaccurate rule.

Disclosed technologies can operate by analyzing changes that are made to data elements of data collections over time, where a data element has a value and a semantic meaning. A "data collection" can be set of data elements having some semantic relationships. For example, data elements can be values associated with a record of a database table, where the attributes of the table describe various properties of the records, and each record represents an instance of the data collection. A data collection (sometimes referred to as a data object) can be a collection of data elements that represents an analog world counterpart. The data collection can be separate from, but mapped to, one or more database tables. Or, a data collection need not be maintained in a relational database. For instance, a data collection can be an instance of an abstract data type, where data members of the data type serve as data elements for the data collection and describe some feature of the "thing" that the abstract data type represents.

At least in part, disclosed technologies can identify association rules based on changes to a particular data element of a data collection that is made to multiple instances of the data collection. That is, for example, if an attribute of multiple records of database table is changed to the same value, it may suggest that a rule can be defined such that data collections having particular combinations of other attribute values should have the changed value. Data collections having other attributes in common may suggest some common feature between the data collections, such that all data collections having such commonality should have the new value for the changed attribute.

In some cases, not all attributes associated with a data collection will imply that instances with common attribute values share some kind of common feature, or at least a common feature that is relevant for a particular association rule, or for a particular association rule in a particular category. Accordingly, in some aspects, disclosed technologies can use one or more, typically a plurality, of scope attributes in determining whether an association rule exists and is appropriate. Removing non-meaningful attributes from the analysis can improve the accuracy of the rule determination process, such as by reducing the chances of having differences in non-meaningful attributes mask commonality between meaningful attributes. The converse is also true, that removing non-meaningful attributes can avoid having commonality between non-meaningful attributes mask differences between meaningful attributes.

Accordingly, in some aspects, disclosed technologies can use one or more, typically a plurality of, scope attributes in determining whether an association rule exists and is appropriate. Removing non-meaningful attributes from the analysis can improve the accuracy of the rule determination process, such as by reducing the chances of having differences in non-meaningful attributes mask commonality between meaningful attributes. The converse is also true, that removing non-meaningful attributes can avoid having commonality between non-meaningful attributes mask differences between meaningful attributes.

The rule mining process can be defined such that only data collections having a threshold commonality are used in determining putative rules. That is, at least in some cases, it may not be necessary to require strict correspondence between the non-changed attributes of two (or more) data collections in order for those data collections to be used in determine possible association rules. However, typically it will be desirable to require at least some threshold level of commonality among attributes in different data collections (e.g., instances of a data object) before implying that changes to one data collection are related to (e.g., were made for the same reason as for) another data collection.

Data collections having the same attribute changed and sufficient commonality in other meaningful attributes can be used to derive possible association rules. As will be further described, rather than one rule, a given change can be used to suggest a plurality of association rules, including rules that involve permutations of meaningful attributes. The possible association rules can be evaluated against stored data for instances of a particular data collection (e.g., records of a particular table). Parameters such as support and confidence can be calculated for the association rules. Association rules meeting parameter thresholds can be selected for implementation, or provided to a user, who can confirm whether a rule should be implemented.

As the validity or usefulness of an association rule can change over time, previously determined rules can be periodically revaluated. The reevaluation can be manually triggered, or can be automatically triggered, including by revaluating rules according to a schedule, or when a threshold number of changes to one or more attributes of the data collection are detected (which can be a number of changes over a sliding time window).

Accordingly, disclosed technologies can provide improved speed and accuracy in determining rules, such as association rules. The disclosed technologies can reduce computing and human resources by determining association rules using a subset of available data, changed data, that may imply a new rule, and using a subset of attributes that are most likely to be involved in/probative of rules, such as in the form of scope attributes. The use of scope attributes can further reduce the amount of data needed to be analyzed in order to determine association rules, as well as improving rule accuracy and potentially limiting generated rules to rules likely to be probative of relationships of interest.

The determined association rules can be used for a variety of purposes, such as to automatically update data, to auto-complete or auto-suggest data as new data is being entered in a data storage or processing system, or to identify potential errors in existing data. The disclosed technologies can improve the accuracy of data, including rapidly updating data when appropriate based on a change of conditions, including in a fully or semi-automated manner.

EXAMPLE 2

Example Machine Learning—Association Rule Determination Processing Flow

FIG. 1 illustrates a data processing flow 100 for a machine-learning method of determining association rules. The data processing flow 100 can operate on source data 108, such as data maintained in (or mapped to) one or more database tables. However, source data 108 can be stored in other formats or in another manner. The source data 108 can be for a particular type of data object, where a data object can be defined to include a plurality of attributes 112. A data object can be, for example, an entity represented by a database table 116, where the attributes 112 are fields of the table, and rows 120 of the table can represent instances of the data object. A data object can be another type of data collection used to instantiate instances of a common schema, such as instances of an abstract or composite data type.

Each data object instance 120, or row, of the database table 116 can include an identifier 124. In addition, the data object associated with the instances 120 can be associated with an identifier or type. Instances 120 can be associated with particular values 128 for each attribute 112 (although, in at least some cases, particular instances 120 need not include values for every attribute, or some attributes can have default or null values).

In a processing step 132, changes to the instances 120 can be recorded in a change log 136. The change log 136 can include, such as in tabular format, data summarizing a change to an instance 120, such as the identifier 124 of the relevant instance, an identifier 112 of the attribute for which a value was changed, an original value 142 for the instance, and a final, or changed, value 144 for the instance. In at least some cases, the original value 142 need not be included in the change log 136.

In a processing step 148, the change log 136 is analyzed to determine attributes 112 having a common change. That is, instances 120 having a change to the same attribute 112, where the attribute was also changed to the same final value 144 are determined and maintained as a change set 152. The change set 152 can include an identifier 154 for the change, and the identifiers 124 for the relevant instances 120.

In a processing step 158, attribute values are retrieved, such as from the source data 108, for attributes other than the attribute of a change set 152 being analyzed. In some cases, such other attributes can be restricted, or defined, based on a list 160 (or other definition) of scope attributes 162. The other attributes, optionally constrained by the scope attribute list 160, can be analyzed to identify a common occurrence frequency among such other attributes among the objects of the change set 152. Typically, a most commonly occurring value for each attribute being analyzed is collected, such as in a table 164 (although, as with the other data sets discussed with respect to FIG. 1, the data can be maintained in any desired format, and need not be stored in a tabular format or persisted), which lists a particular attribute 168, other than the changed attribute, the most commonly occurring value 170, and an occurrence frequency 172 for the most commonly occurring value.

For example, if a particular attribute (such as a scope attribute 162) occurs in three out of four object instances having a particular attribute value change, the occurrence frequency, or percent commonality, can be 75%. If desired, other ways of determining which scope attributes to be further analyzed for association rules can be used, in place of, or in addition to, determining an occurrence frequency or similar metric. For instance, scope attributes whose values have changed more or less recently can be weighted more heavily, depending on the implementation and semantic of the scope variable. For example, if a scope variable also has a recently changed value, that could be correlated with a change to the attribute being used as a consequent, such that the cause of the change to the consequent attribute may make the rule with the changed scope attribute as an antecedent more useful or predictive. Scope attributes 162 can themselves be weighted or ranked as being more or less probative of commonality (including for a particular type or category of association rule). These factors can also be used to determine which putative association rules to construct and test, as well as the putative association rules will be suggested to a user or implemented, as further described below.

The attribute 112 associated with the change set 152 being analyzed and the attributes 168 associated with the table 164 are used to construct a set 180 of one or more association rules 184 in a processing step 176. The attribute 112 associated with the change set 152 is used as a consequent of a rule 184, and one or more of the attributes 168 are used as antecedents for the rule. For example, assume an attribute A was changed from value 1 (Va1) to value 2 (Va2) in a plurality of objects, as determined from the change log 136. Assume that the scope attributes 162 retrieved are B, D, E, and F, and that attributes B, D, and E were determined to meet a threshold level of commonality among the objects of the change log 136 having the specified change to attribute A, and that attribute F was not determined to satisfy the threshold. Taking the common values of B, D, E, and F as Vb, Vd, Ve, and Vf, respectively, one association rule could be {B=Vb}→{A=Va2}. Or, stated another way, the rule could be, when the value of attribute B is Vb, the value of attribute A should be Va2. Other rules could be: {D=Vd}→{A=Va2}, {B=Vb, E=Ve}→{A=Va2}. In general, the possible antecedents for an association rule can be the powerset of the scope attributes, minus the empty set.

Generally, the present disclosure discusses association rules having a single consequent. However, the use of a single consequent is for the sake of convenient presentation. If desired, multiple attributes 112 in the change log 136 can be analyzed concurrently in a similar manner as described above for a single attribute change. When determining the possible consequents, the possible consequents can be the powerset of the attribute changes, minus the empty set. The set of all possible association rules is then the combination of all possible (non-empty) subsets of antecedents with all possible (non-empty) subsets of consequents. Generally, however, rules that involve more attributes can be more difficult to understand, and possibly less meaningful. Thus, a limit on a number of antecedents in a rule, consequents in a rule, or total rule length can be set, either as a set value or a user-configurable value. As discussed above, weightings or other factors can be used to determine attributes that are prioritized for inclusion in putative association rules.

Returning to the data processing flow 100, the putative association rules 184 can be evaluated in a processing step 186. Evaluating the putative association rules 184 can involve analyzing stored data, such as the source data 108, using the putative rules and determining performance parameters, such as support and confidence, for the rules. The processing 186 produces a set 190 of rules 188 and associated evaluation metrics 192 with values 194. Putative rules 184 not meeting threshold levels for evaluation metrics (e.g., support, confidence, or combinations thereof, and/or optionally other metrics) can be excluded from further use or analysis. Rules 188 satisfying the established threshold or thresholds can be provided to a user for analysis at 196. Alternatively, rules 188 satisfying the established threshold or thresholds can be implemented at 198. When a user is provided with a rule or rules 188 at 196, the user can select one or more of the rules to be implemented, which then can be implemented as in 198.

Implementing a rule can involve analyzing a data set to identify objects that do not comply with the rule. Objects that do not comply with the rule can be modified to comply with the rule (including filling in values that were missing when the data was entered into the system), can be removed, or can be flagged for further review or analysis. Implementing a rule can also involve automatically setting or suggesting particular values for particular attributes as data is being provided to a system, either in an automated fashion or in the form of suggested or autocomplete values.

Providing an association rule 188 at 196 or implementing an association rule at 198 can include ranking the association rules. Association rules 188 can be ranked according to confidence, support, or a combination of these metrics. Particularly when an association rule 188 is to be automatically implemented, criteria can be set to determine which of multiple, possibly conflicting rules, should be selected for implementation, such as a rule having a highest confidence value, a highest support value, or a highest value for some calculation that includes confidence and support. However, other factors can be used in ranking rules 188, such as prioritizing certain scope attributes 162, which can be a predetermined setting or can be based on calculations from object data (including from table 164), such as prioritizing rules that include scope attributes having a highest percent commonality or other metric.

EXAMPLE 3

Example Data Structures and Association Rule Determination

Figure 2:
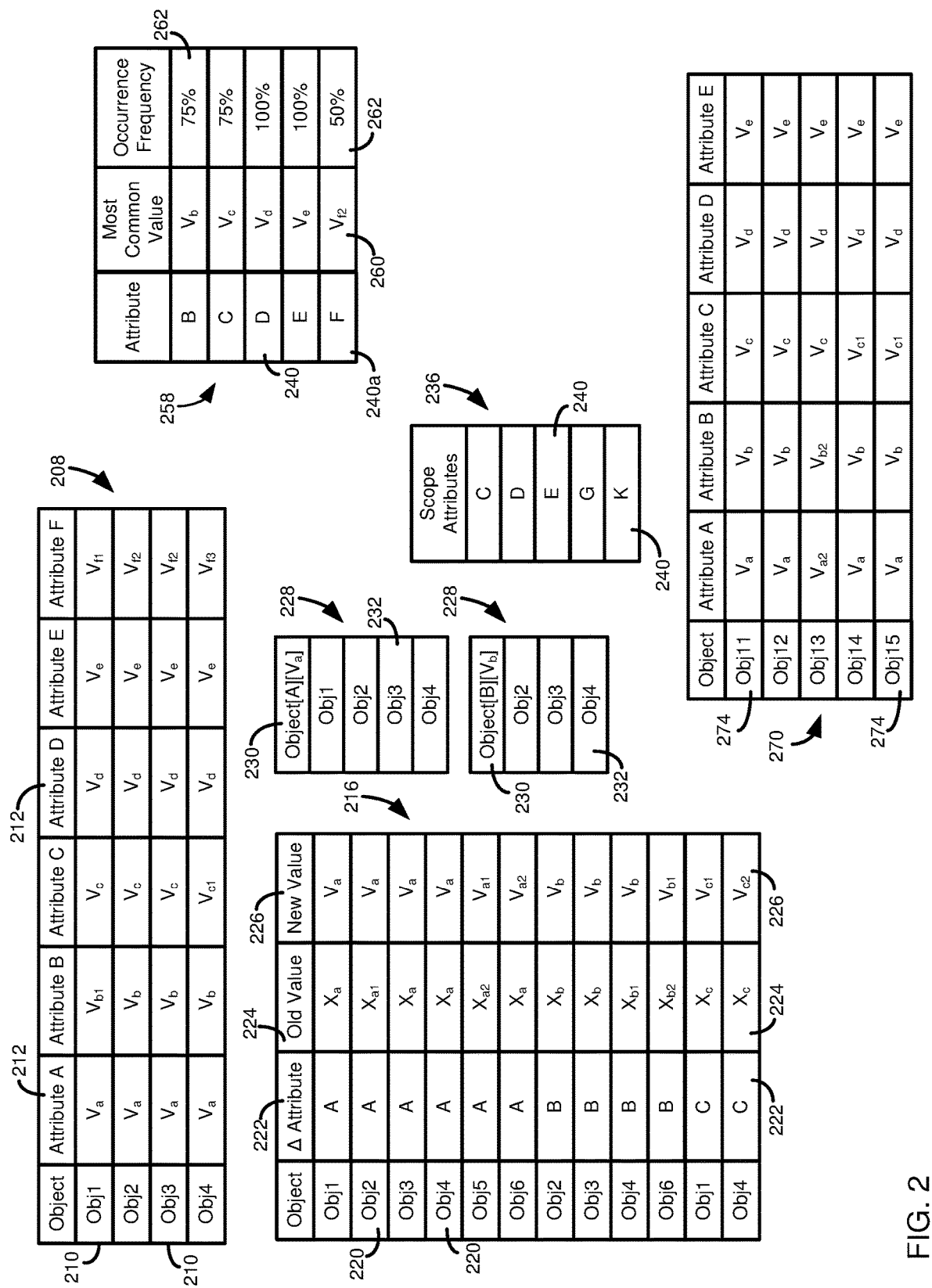

FIGS. 2 and 3 illustrates example data structures that can be used in carrying out a disclosed method for machine learning assisted determination of association rules, such as the data processing flow 100 of FIG. 1.

Referring first to FIG. 2, the data structures can include source data, such as in the form of one or more database tables 208. In a database table 208, each row or record 210 can represent an object or data collection, which can have a common schema. For example, the common schema can be provided by the columns or attributes 212 of the table 208. The attributes 212 can be associated with metadata, such as an identifier (e.g., a name, which, in at least some cases, can provide, or be associated with, a semantic meaning of the attribute) or a data type for the attribute (e.g., integer, string, time, date, VARCHAR). As described, in some cases, source data may not, and need not, be stored in the form of a database table 208. For example, the source data can be maintained in instances of an abstract or composite data type, such as in the form of data members. If desired, data elements of such source data can be collected in a database table or in a data structure that is equivalent to a database table or can be manipulated in an analogous manner as a database table, such as a two-dimensional array, or a collection of vectors, where each vector can represent a particular attribute and each index position can represent a value for a particular object or collection. Or, the data can be maintained it its original format, such as instances of a class, but otherwise read and processed as described herein.

Changes to the source data (e.g., data in a database table 208) can be tracked. For instance, when a value of the source data is changed, the change can be written in a change log 216. In other cases, the change log 216 can be generated in a different manner, such as by periodically comparing an archived, original version of the source data with a current version of the source data, or otherwise comparing two versions of the source data to determine changes. The change log 216 lists identifiers 220 for particular objects (which can correspond to objects 210 of the database table 208), an attribute identifier 222 indicating the attribute that was changed, an original or initial value, $T_I$, 224 for the attribute, and a changed value, $T_C$, 226 for the attribute.

The change log 216 can have a different format or structure, if desired, provided that it includes at least an object identifier, an identifier of a changed attribute, and a final value. That is, in some cases, it may not be necessary to track the initial value of the changed attribute. In cases where the initial value is not used, changed attributes can be associated with a flag or metadata indicating that the value changed. The change log 216 can include additional information, if desired, such as a date a change was made or indicators of any prior changes to a particular attribute value. However, in some cases, an initial value of the changed attribute can be used in an eventual rule, such as defining a rule such that a change from a specific initial value to a specific changed value triggers a particular result.

As discussed with respect to the data processing flow 100, the change log 216 can be analyzed to determine data objects having a common attribute change. A common attribute change can be indicated by (1) an object having a change to a given attribute; and (2) the change results in the same target final or changed value for the given attribute. All or a portion of attribute changes in the change log 216 can be used to generate attribute change lists 228, which provide a change identifier 230 (e.g., the attribute identifier and final value) and identifiers of objects 232 (e.g., in the change log) having that change.

In the discussion of the data processing flow 100, it was mentioned that some attributes may be probative of meaningful similarities and differences between objects, and other attributes may not. Accordingly, a scope attribute list 236 is provided, where the list of scope attributes lists identifiers 240 of scope attributes defined as meaningful and to be used in generating and evaluating association rules. In some cases, a scope attribute list 236 can be associated with a particular context, category, or type. Depending on the nature of the association rules being generated, different scope attribute lists 236, or combinations of scope attribute lists, can be used. A scope attribute list 236 can include metadata describing particular contexts etc. where the list may be relevant.

In some cases, scope attributes 240 can be manually identified and added to a scope list, such as by a subject matter expert who understands the nature of the objects being analyzed and the meaning and relationships of the attributes. In other cases, the scope attributes 240 can be identified based on metadata associated with a definition or use of the attribute, such as metadata associated with an attribute of the table 208. That is, the metadata can identify an attribute as a scope attribute for use in association rule mining, and, optionally one or more categories, types, or classifications where the metadata can serve as a scope attribute.

The scope attributes 240 of the list 236 and the objects 232 of the change list 230 can be combined to generate association rules 248 (shown as rules 248a-248p), shown in FIG. 3. That is, the attribute 220 (or 210) for which the change list 230 was constructed can serve as a consequent 252 (shown as consequents 252a, 252b) in an associate rule of the association rules 248. One or more of the scope attributes 240 of the list 236 can serve as an antecedent 256 in each of the association rules 248.

As explained in Example 2, further restrictions can be placed on other attributes, such as when a scope attribute 240 (or another attribute, when scope attributes are not used to restrict the generation of association rules 248) will be used in an association rule, or, more generally, to determine values that will be used in an association rule. That is, values for the scope attributes 240 (or attributes, generally when non-scope attributes are allowed for association rule antecedents, or scope attributes are not implemented) for the objects 232 of the change list 230 can be analyzed. Typically, a most commonly occurring value for each attribute to be considered for inclusion in an association rule is determined. These values, and the identifier for the corresponding attribute, can be used as antecedents 256. Table 258 (FIG. 2) lists attributes being analyzed, in this case scope attributes 240, the most commonly occurring value 260, and the occurrence frequency 262 (e.g., if the most common value occurs in three out of four data object instances in a change list 230, the occurrence frequency can be 75%).

As mentioned, in at least some cases, occurrence frequencies or other criteria can be used to limit, or prioritize, attributes (in this case, scope attributes 240) for inclusion in an association rule 248. In a particular example, a threshold can be set for a minimum occurrence frequency 262 that must be met before an attribute in the table 258 will potentially be used in an association rule 248. For example, scope attribute 240a only has a common value for half of the objects 232. In the event that a threshold is set for a minimum of 75% commonality, scope attribute 240a would not be selected for use in an association rule 248. Occurrence frequency can also be used to prioritize which scope attributes 240 will be used in an association rule 248, particularly if limits are set on the number of attributes that can be included in an association rule, or in a particular portion of an association rule (e.g., as antecedents).

Other types of criteria can be set for when a scope attribute 240 (or other attribute in the table 258) will be used in an association rule 248, or a priority for selecting scope attributes for inclusion in an association rule. Such criteria can include how recently or often a value of the scope attribute 240 was changed, or how long objects 232 shared a common value for a scope attribute, or how many objects other than objects in the change list 232 have the value (that is, for example, taking into account objects that already have the attribute value for which the change list was created, rather than just objects that were changed to the value within a particular time period).

Returning to FIG. 3, association rules 248 can include one or more of scope attributes 240 (optionally meeting any thresholds or selection criteria) as antecedents 256, and multiple association rules can be created for various permutations of one or more (including all) attributes in the scope attribute list 236. Rule 248a includes only attribute D as an antecedent 256a, rule 248b includes attribute D and attribute E as antecedents 256b, rule 248c includes attribute D and attribute G as antecedents 256c, and rule 248d includes attribute D and attribute C as antecedents 256e. More complicated rules 248 can include permutations of scope attributes 240 that include a larger number of scope attributes as antecedents, such as rule 248e, which includes attribute D, attribute E, and attribute G as antecedents 256e, rule 248f, which includes attribute D, attribute E, and attribute C as antecedents 256f, and rule 248g, which includes attribute D, attribute G, and attribute C as antecedents 256g. An association rule 248h can include all four of the scope attributes D, E, G, and C as antecedents 256h.

As discussed above, one or more (including all) of the permutations of scope attributes 240 used in rules 248a-248h can be repeated for association rules that include other change attributes 232, or combinations of change attributes. Association rules 248i-248p include the same permutations of scope attributes 240 represented in rules 248a-248h, but include a first change attribute 252a, A (used in rules 248a-248h), and a second change attribute 252b, B. Again, it may be desirable to set limit on the complexity of an association rule 248, such as a limit on the number of antecedents 256 in a rule, the number of consequents 252 in a rule, the total number of attributes in a rule, or a combination of these criteria.

After the association rules 248 have been constructed, they can be evaluated against a data set. The data set can be a table 270 (FIG. 2), or other data collection or repository, that includes objects 274 that are similar to the objects 220, but which include objects other than, or in addition to, the objects 220. For example, all or a portion of the objects 274 can be objects where the consequent or consequents 252 of a rule 248 were not changed, or at least not changed within a period used to determine the change log 216. Evaluation can include determining one or more of confidence, support, lift, or conviction. In particular embodiments, at least confidence and support values are determined.

These evaluation criteria can be at least generally as used in the field of association rule learning. In particular, support can be an indication of how frequently a set of antecedents (sometimes referred to as an item set) appears in the data being evaluated, regardless of whether the set of antecedents is associated with the consequent (or set of consequents) in a particular association rule. Confidence can be an indication of how often a particular association rule has been found to hold, or be true, for a given set of consequents associated with the rule. Lift provides an indication of whether the antecedents and consequents of a rule are independent, such as with 1 indicating independence, a value greater than 1 indicating dependence (with higher values indicating higher dependence) and values less than 1 indicating a negative correlation (e.g., the presence of one makes the presence of the other less likely). Conviction provides a measure of how much more often a rule would be incorrect if the antecedents and consequents had a random association.

The evaluation metrics can be used, alone or in combination, to filter association rules 248 that will be displayed to a user, or which will be automatically implemented or otherwise further processed. The evaluation metrics can also be used to rank association rules 248, in place of, or in addition to, being used to filter rules. Once determined, association rules 248, or at least rules meeting threshold evaluation criteria (which can be a combination of multiple criterion or a single criterion), can be used in a number of ways. For example, the rules 248 can be used to suggest values during data entry, to provide default values, to identify possible errors in entered data, or to modify or update a data set. Evaluation metrics can be periodically rerun, and rules 248 removed or reprioritized based on changes in the evaluation metrics. If rules 248, such as a threshold number of rules, lose a threshold amount of predictive value, a new rule generation process, as has been described with respect to FIG. 2, can be automatically re-run, in some implementations.

EXAMPLE 4

Figure 4:
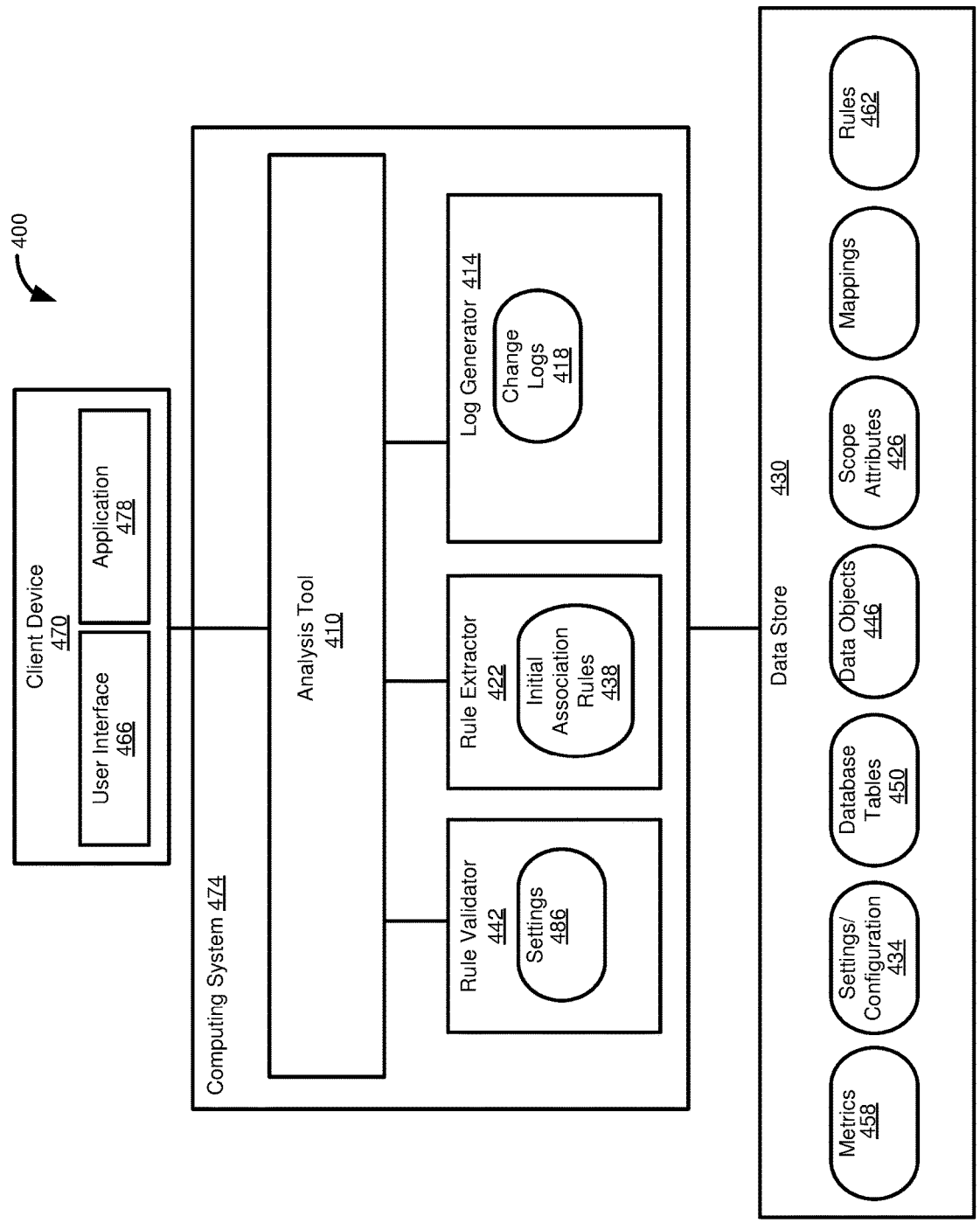
FIG. 4 is an example computing environment in which disclosed technologies can be implemented.

Example Machine Learning Computing Environment for Association Rule Determination FIG. 4 illustrates a computing environment 400 in which disclosed technologies can be implemented. The environment 400 includes an analysis engine or tool 410. The analysis engine 410 can call and coordinate various components of the environment 400 to carry out all or a portion of an association rule generation process.

For example, the analysis engine 410 can call a log generator 414. The log generator 414 can log changes to a data set in various ways. For example, the log generator 414 can receive notifications when particular data are changed (e.g., a procedure can be called as part of a process to change a value, such as a database trigger or similar function call).

Or, the log generator 414 can analyze versions of data to determine when data (e.g., a particular database record, or a particular attribute or field of a particular database record) have changed, or can analyze metadata associated with the data that can indicate that data has changed, and optionally other information, such as a date of change, how the change was initiated, or a prior value.

In some cases, a disclosed association rule determination method can determine and evaluate association rules based on an identification that data has changed within a given time period, and the new value of the data. That is, it may not be necessary to use the prior value of the data. In particular implementations, when a data analysis method has been carried out, a flag or other indication can be set indicating that the current state of the data is a baseline, or previously evaluated state, and the flag can be set to indicate a change if the data is then later changed. Changes to data that are can be maintained in a change log 418, which can have the form of the change log 136 of FIG. 1 or the change log 216 of FIG. 2. Although shown as a single change log 418, the change log generator 414 can maintain multiple change logs, such as for different sets of monitored data (e.g., database objects), database tables, or data associated with particular software applications.

The change log 418 can be processed by a rule extractor 422. The rule extractor 422 can process data from the change log 418, such as to identify changed attributes and construct collections of objects (or other data items or collections) having a particular attribute change (e.g., a particular attribute being changed to a particular value). For particular changed attribute and value combinations, the rule extractor 422 can identify other attributes that are in common for data objects in the collection being analyzed. Those attributes, optionally filtered using a list of scope attributes, can optionally be further analyzed to determine one or more metrics that can be used to select or prioritize attributes for use in generating potential association rules. The list of scope attributes can be a list 426 (or other data structure or data storage format) stored in a data store 430, such as a relational database system. In one example, a metric can be determined that represents the number or percentage of data objects having a particular attribute (other than the changed attribute being analyzed) in common. Metrics to be used, and in some cases particular settings (e.g., priority rules, thresholds) can be stored in a settings/configuration store 434 of the data store 430, or in another data repository.

Change attributes identified by the rule extractor 422 can be used along with the other common attributes, and optionally settings in the settings/configuration store 434, to produce an initial set of association rules 438. The settings/configuration store 434 can include settings that define how association rules are constructed, such as rules prioritizing particular attributes (e.g., by identity, or using particular metrics) or rules defining a maximum number of antecedents, a maximum number of consequents, a maximum rule length, a maximum number of rules, or a combination of such factors.

The initial set of association rules 438 can be evaluated be a rule validator 442. The rule validator 442 can access a data set that can be used to produce evaluation metrics for the association rules in the initial set 438. For example, the rule validator 442 can access stored data objects 446, database tables 450. The metrics can include metrics such as confidence, support, lift, conviction, or combinations thereof. In some cases the calculated metrics can be stored, such as in a metrics store 458 stored in the data store 430 (such as for use in tracking validity or usefulness of an association rule over time).

The rule validator 442 can evaluate the determined metrics to analyze whether rules of the initial set 438 of association rules comply with particular thresholds or other criteria, such as having minimum confidence, support, or a combination of specified threshold confidence and support values. Depending on the implementation, all or a portion (such as determined based on the thresholds or other criteria) of the association rules in the initial set 438 can be stored in a output set of association rules 462 (such as in the data store 430), and output for display, such as through a user interface 466 of a client device 470 in communication with a computing system 474 on which the analysis tool 410 is executing (which, in some cases, can also be the client device 470), or to a software application 478 executing on the client device 470. In some cases, the software application 478 can automatically use or implement all or a portion of the rules in the output set of association rules 462, such as to determine data correctness, provide default data values, to suggest data values, or to suggest possible data errors.

In addition to determining the accuracy of an initial set 438 of association rules, the rule validator 442 can periodically reevaluate an initial set 438 of association rules, an output set of association rules 462, or both. The initial set 438 of association rules or the output set of association rules can be stored in the rules store 462 of the data store 430. Reevaluation of a set of association rules can occur periodically as determined by settings 486 of the rule validator 442 (it can be stored in the data store 430, in addition to, or in place of, being maintained in the rule validator), can be manually triggered, can be triggered on predetermined criteria (e.g., a particular number of changes occurring, the occurrence of a particular type of event), or on multiple of these events.

EXAMPLE 5

Example Configuration Settings User Interface

Figure 5:
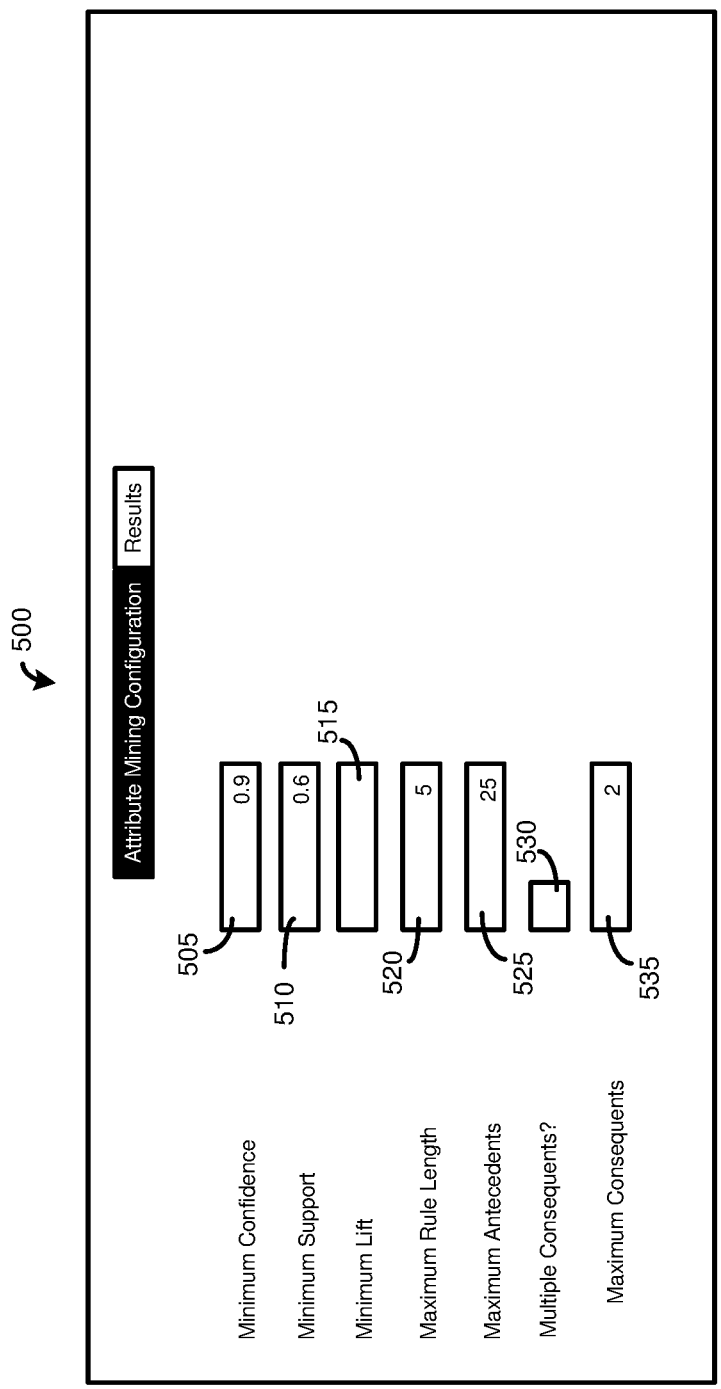
FIG. 5 is an example user interface screen allowing a user to configure an association rule determination process.

FIG. 5 is an example user interface 500 where a user can set configuration settings for determining how association rules should be extracted. The screen 500 includes a field 505 where a user can enter a minimum confidence value and a field 510 where a user can enter a minimum support value. Rules not meeting these criteria will not be returned to a user, or implemented, depending on the particular use case scenario. A field 515 can be used to enter a minimum lift value. The field 515 can be optional, such as lift not being used as a criterion if a value is not provided in the field 515. Similarly, confidence or support can be omitted as criteria (or default system criteria used) if values are not provided in the field 505 or the field 510.

A user can enter a maximum rule length in the field 520. For example, the value of five can indicate that no more than five attributes can included in an association rule, either as antecedents or as consequents. A maximum number of antecedents can be specified by a value entered in field 525. In some cases, association rules having a single consequent are of particular interest. However, functionality can be provided for determining association rules having multiple consequents. A user can specify that association rules having multiple consequents should be determined by selecting check box 530. A maximum number of consequents can be provided in a field 535. Note that a value provided for a maximum rule length in field 520 will typically have precedence over values entered in the fields 525, 535 for maximum antecedents or consequents. That is, for example, if a maximum of 10 antecedents is specified, rules having more than 4 attributes will not be evaluated (or returned) if the maximum rule length is set to 5 (as at least one consequent is needed). Note also that system default limitations can be provided if values are not entered for fields 520, 525, and 535, in at least some implementations.

EXAMPLE 6

Example Results User Interface

Figure 6:
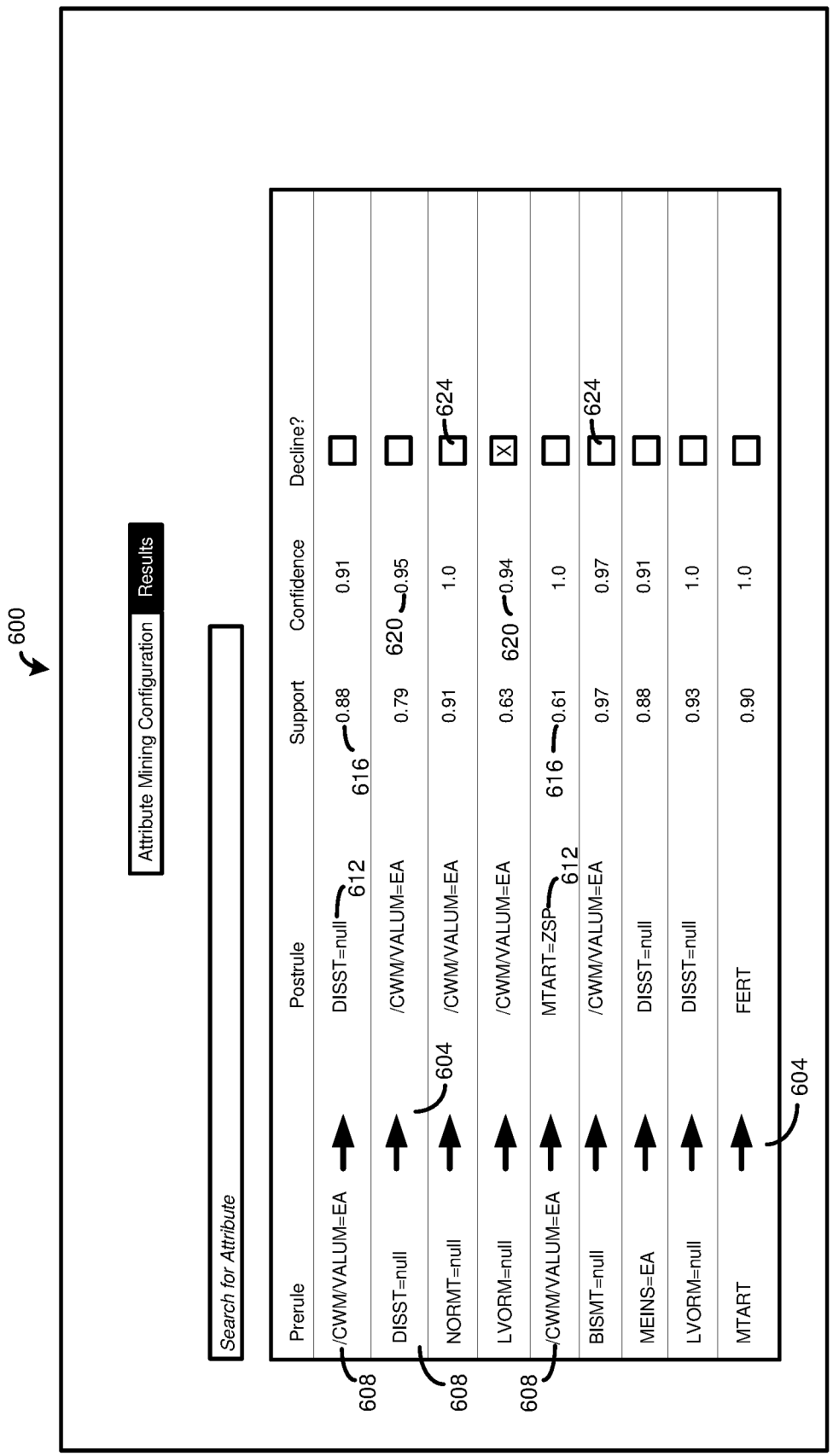
FIG. 6 is an example user interface screen for displaying association rules.

FIG. 6 is an example user interface screen 600 where a user can be presented with association rules determined from an association rule mining process, such as using configuration settings provided through the user interface screen 500 of FIG. 5. The screen 600 lists a plurality of association rules 604. Each rule 604 is shown with rule antecedents 608 and rule consequents 612. As illustrated, the association rules 604 have a single antecedent 608 and a single consequent 612, but rules having other lengths or numbers of antecedents or consequents can be provided using the disclosed technologies.

Each association rule 604 is displayed with associated evaluation metrics, such as a support value 616 and a confidence value 620. A user interface element 624 can be provided, by which a user can indicate that a particular rule 604 should not be used.

In some cases, an association rule be associated with a rating, which can be a user provided rating. The ratings can be used, for example, to help the user or others determine which rules are the most useful, and should be implemented. In some cases, rules having a minimum rating can be automatically implemented. Optionally, the ratings can be used to guide how rules are determined. That is, characteristics of favored association rules 604 can be used to adjust settings such as a maximum rule length, maximum number of antecedents, maximum number of consequents, and scope attributes or rankings of scope attributes used in generating association rules.

EXAMPLE 7

Example Methods of Association Rule Determination

Figure 7:
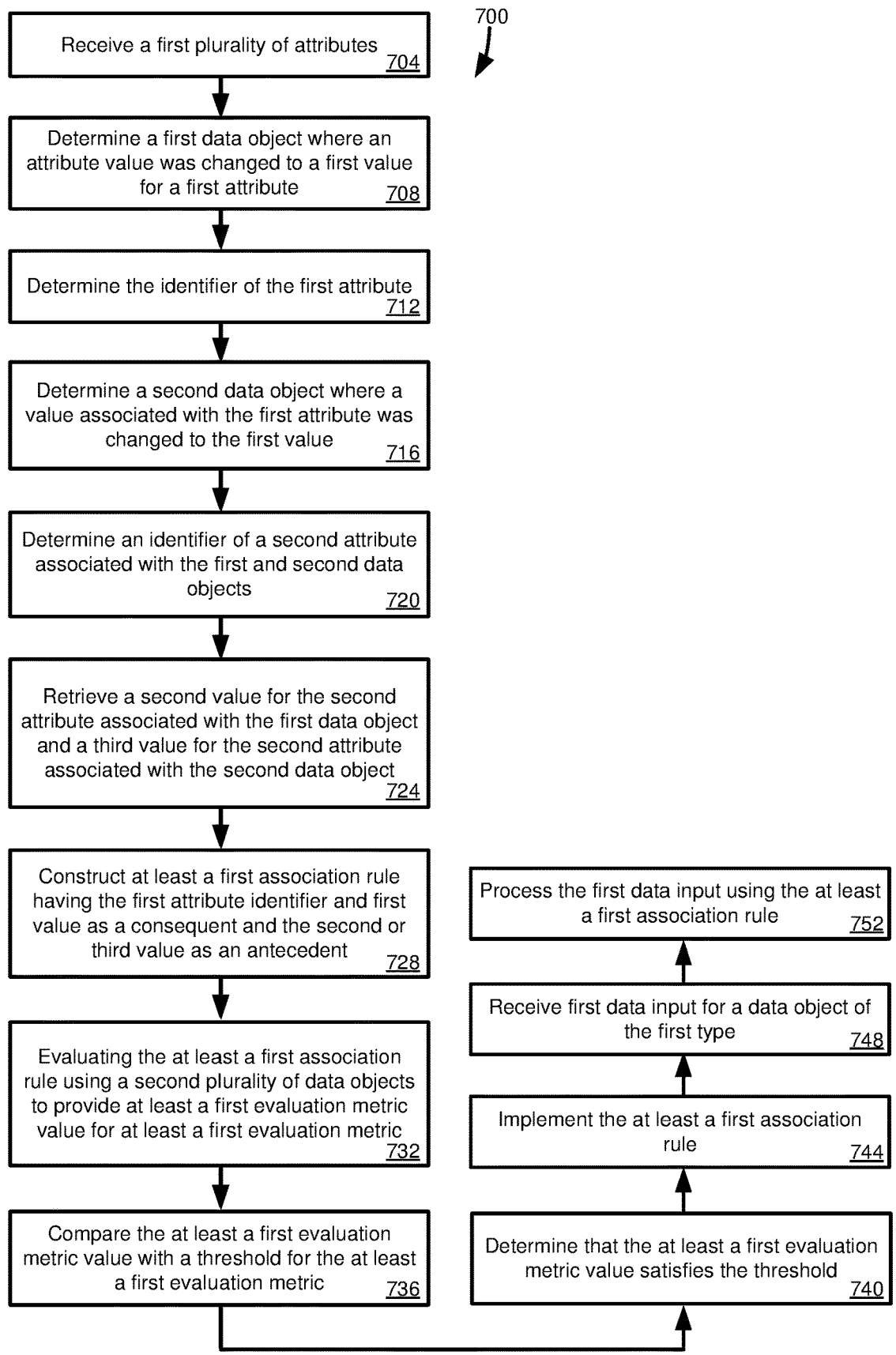
FIGS. 7-9 are flowcharts illustrating operations in various embodiments of association rule mining according to the present disclosure.

FIG. 7 is a flowchart of an example method 700 of using a machine learning technique to determine association rules based on changes to attributes of data object instances of a data object type. The method 700 can be carried out in the computing environment 400 of FIG. 4, and can use the data structures of FIGS. 2 and 3. At 704, a first plurality of attributes is retrieved that are associated with a plurality of data objects of a first type. A data object includes multiple attributes, at least a portion of the multiple attributes being in the first plurality of attributes. An attribute is associated with a common identifier among the first plurality of data objects. The plurality of data objects comprises respective values for the attribute.

A first data object of the plurality of data objects is determined at 708 where an attribute value was changed to a first value for a first attribute. An identifier of the first attribute is determined at 712. At 716, a second data object of the first plurality of data objects is determined where a value associated with the first attribute was changed to the first value. An identifier of at least a second attribute associated with the first and second data objects is determined at 720. At 724, a second value for the second attribute associated with the first data object and a third value for the second attribute associated with the second data object are retrieved.

At least a first association rule is constructed at 728. The at least a first association rule has the first attribute identifier and the first value as a consequent and the second attribute and the second or third value as an antecedent. At 732, the at least a first association rule is evaluated using a second plurality of data objects, which can include at least a portion of the first plurality of data objects, to provide at least a first evaluation metric value for at least a first evaluation metric. The at least a first evaluation metric value is compared, at 736, with at least a first threshold defined for the at least a first evaluation metric.

It is determined at 740 that the at least a first evaluation metric value satisfies the at least a first threshold. At 744, the at least a first association rule is implemented. First data input for a data object of the first type is received at 748. At 752, the first data input is processed using the at least a first association rule.

Figure 8:
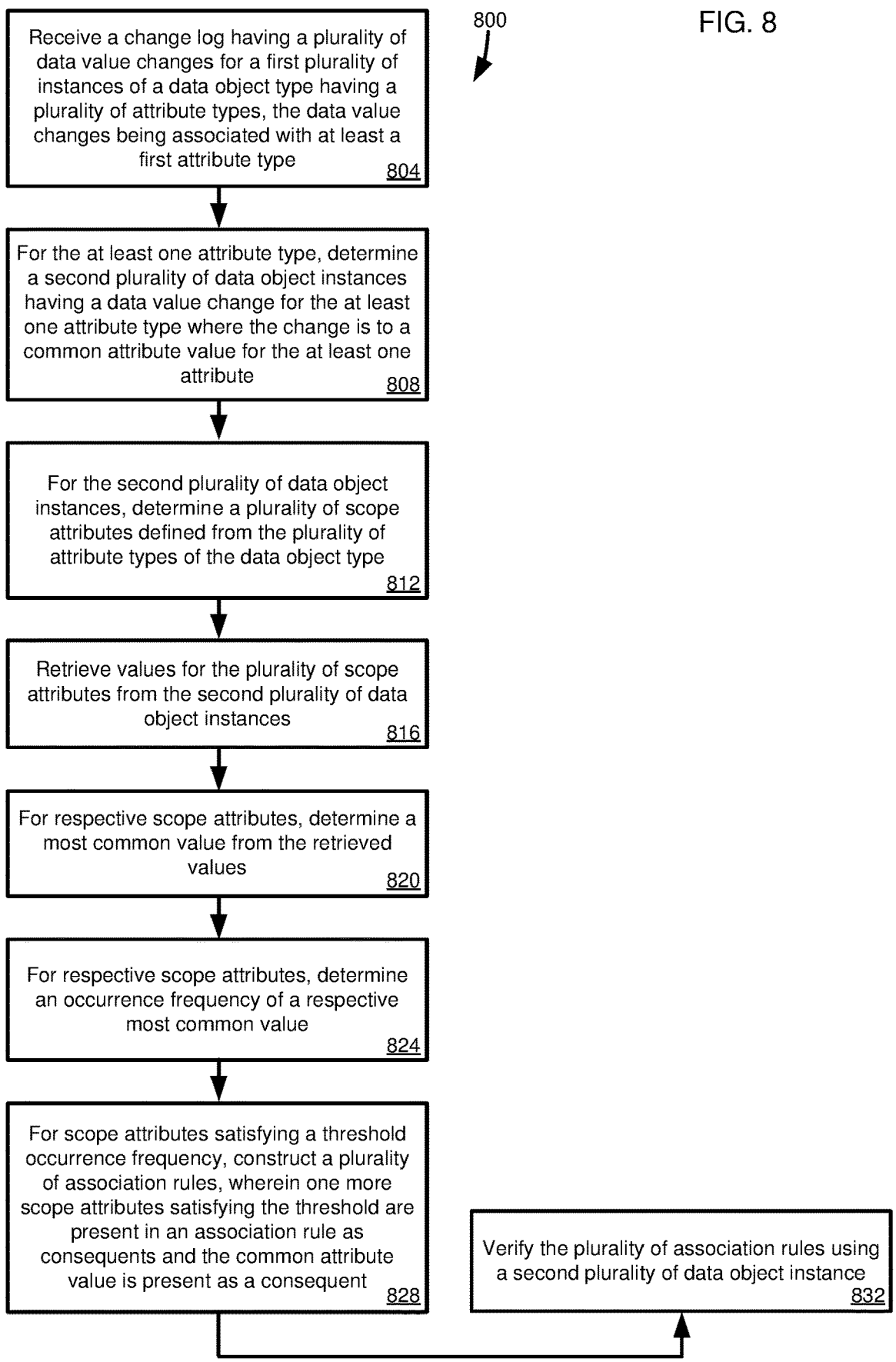

FIG. 8 is a flowchart of a method 800 that can be performed by a machine learning association rule determination tool. The method 800 can be carried out in the computing environment 400 of FIG. 4, and can use the data structures of FIGS. 2 and 3. At 804, a change log is retrieved that includes a plurality of data value changes for a first plurality of instances of a data object type. The data object type includes a plurality of attribute types, where the data value changes are associated with at least a first attribute type of the plurality of attribute types. For the at least a first attribute type, at 808, a second plurality of data objected instances, selected from the first plurality of data object instances, are determined having a data value change for the at least a first attribute type where the change is to a common value.

At 812, a plurality of scope attributes is determined that are defined for the plurality of attribute types of the data object type. Values for the plurality of scope attribute are retrieved from the second plurality of data object instances at 816. At 820, a most common value from the retrieved values is determined for the plurality of scope attributes. For respective scope attributes of the plurality of scope attributes, an occurrence frequency of a respective most common value for a respective scope attribute is determined at 824.

At 828, for scope attributes of the plurality of scope attributes satisfying a threshold occurrence frequency, a plurality of association rules is constructed. One or more scope attributes satisfying the threshold are present in a respective association rule as rule antecedents and the common attribute value of the at least a first attribute type is present in the respective rule as a consequent. The plurality of association rules is verified at 832 using a second plurality of data object instances, which can include at least a portion of the first plurality of data object instances.

Figure 9:
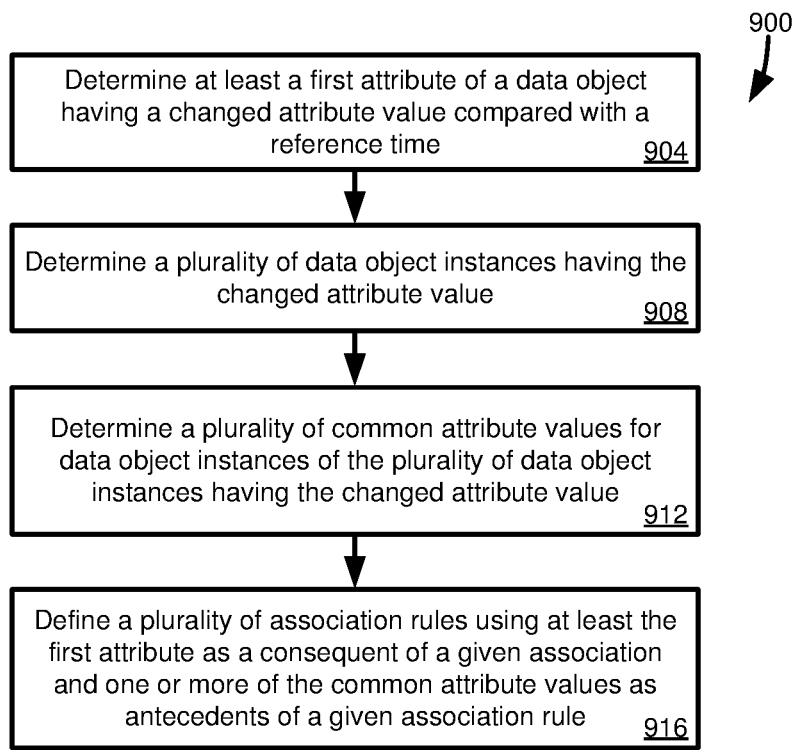

FIG. 9 is a flowchart of a method 900 for implementing a machine learning process for determining association rules. The method 900 can be carried out in the computing environment 400 of FIG. 4, and can use the data structures of FIGS. 2 and 3. At 904, at least a first attribute of a data object is determined that has a changed attribute value compared with a reference time. A plurality of data object instances having the changed attribute value are determined at 908. At 912, a plurality of common attribute values for data object instances of the plurality of data object instances having the changed attribute value are determined. A plurality of association rules is defined at 916. The plurality of association rules includes the at least the first attribute as a consequent of a given association rule and one or more of the common attribute values as antecedents of a given association rule.

EXAMPLE 8

Computing Systems

Figure 10:
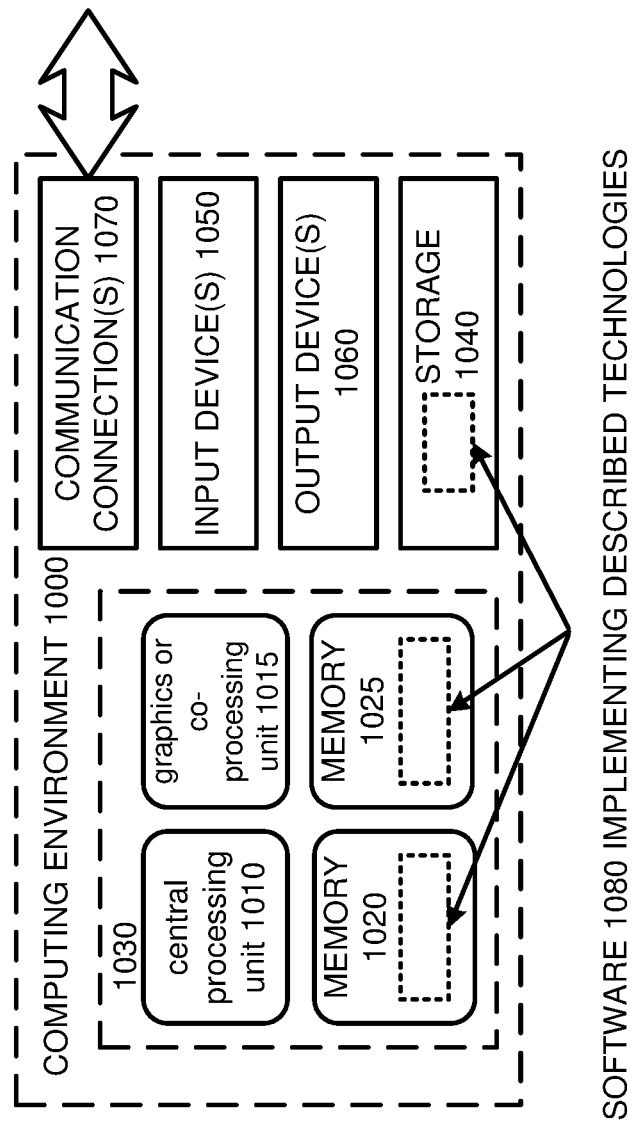
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the computing environment 400 of FIG. 4. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 9

Cloud Computing Environment

Figure 11:
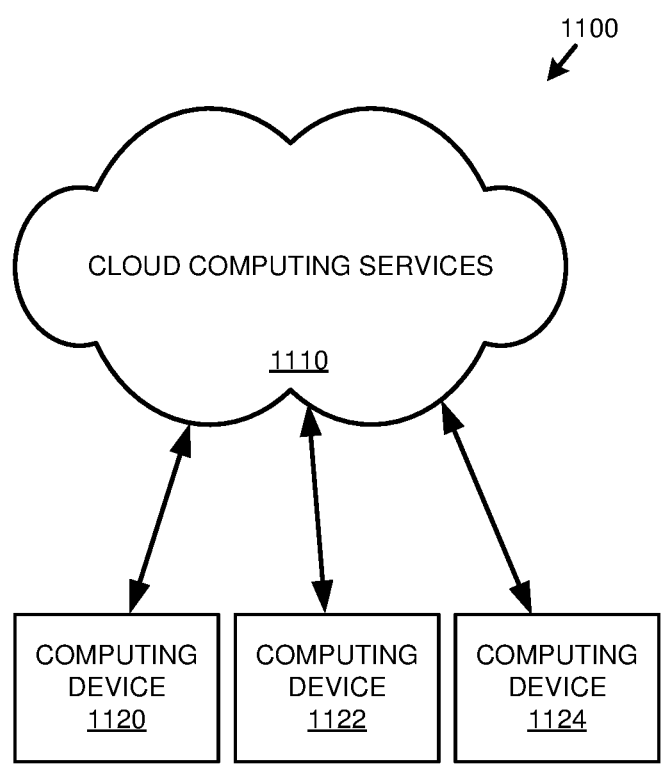
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

EXAMPLE 10

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a computing system comprising at least one hardware processor and at least one memory coupled to the at least one hardware processor, the method comprising:

receiving respective changes to one or more attributes of a first plurality of data object instances of a second plurality of data object instances, wherein the first plurality of data object instances is the second plurality of data object instances or is less than all of the second plurality of data object instances;

updating the first plurality of data object instances with the respective changes;

logging the respective changes in a change log;

retrieving a first plurality of attributes associated with the first plurality of data object instances, the first plurality of data object instances having a first type, data object instances of the first plurality of data object instances comprising multiple attributes, at least a portion of the multiple attributes being in the first plurality of attributes, at least one attribute of the first plurality of attributes being associated with a common identifier among the first plurality of data object instances and data object instances of the first plurality of data object instances comprising a respective value for the at least one attribute;

based at least in part on the change log, determining a first data object instance of the first plurality of data object instances where an attribute value was changed to a first value for a first attribute;

determining the common identifier of the first attribute;

determining a second data object instance of the first plurality of data object instances where a value associated with the first attribute was changed to the first value;

determining an identifier of at least a second attribute associated with the first data object instance and the second data object instance;

retrieving a second value for the at least a second attribute associated with the first data object instance and a third value for the at least a second attribute associated with the second data object instance;

constructing at least a first association rule, the at least a first association rule comprising the common identifier of the first attribute and the first value as a consequent and the identifier of the at least a second attribute and the second value or the third value as an antecedent;

evaluating the at least a first association rule using a second plurality of data object instances of the first type, which can include at least a portion of the first plurality of data object instances, to provide at least a first evaluation metric value for at least a first evaluation metric;

comparing the at least a first evaluation metric value with at least a first threshold defined for the at least a first evaluation metric;

determining that the at least a first evaluation metric value satisfies the at least a first threshold;

implementing the at least a first association rule;

receiving first data input for a data object instance of the first type;

processing the first data input using the at least a first association rule; and (1) wherein the first data input comprises stored data for one or more data object instances of the first type and processing the first data input using the at least a first association rule comprises changing attribute values of the first attribute in at least a portion of the stored data to the first value; or (2) wherein processing the first data input using the at least a first association rule comprises:

receiving the first data input as user input;

determining that the first data input includes a fourth value for the first attribute that is not the first value; and providing an indication to a user that the fourth value may be incorrect; or (3) determining a fourth value for the at least a second attribute, the fourth value being a most common value associated with data object instances of the first plurality of data object instances having a first attribute value changed to the first value; or (4) receiving user input defining one or more scope attributes; and determining that the at least a second attribute is a scope attribute of the defined one or more scope attributes and wherein the retrieving a second value is carried out in response to determining that the at least a second attribute is a scope attribute.

2. The method of claim 1, wherein at least a portion of the second plurality of data object instances are not in the first plurality of data object instances.

3. The method of claim 1, further comprising (3).

4. The method of claim 1, wherein determining a first data object instance of the first plurality of data object instances where an attribute value was changed to a first value for a first attribute comprises evaluating the change log.

5. The method of claim 1, further comprising 4.

6. The method of claim 1, further comprising (1).

7. The method of claim 1, wherein processing the first data input using the at least a first association rule comprises displaying the first value to a user as a suggested value.

8. The method of claim 1, further comprising (2).

9. A computing system comprising:
a memory;
one or more processing units coupled to the memory; and
one or more computer readable storage media storing instructions that, when executed, cause the computing system to perform operations comprising:
receiving respective changes to one or more attributes of a second plurality of data object instances of a first plurality of data object instances, wherein the second plurality of data object instances is the first plurality of data object instances or is less than all of the first plurality of data object instances;
updating the second plurality of data object instances with the respective changes;
logging the respective changes in a change log;
retrieving the change log, the change log comprising a plurality of data value changes for the second plurality of data object instances, the first plurality of data object instances being of a data object type, the data object type comprising a plurality of attribute types, the plurality of data value changes being associated with at least a first attribute type of the plurality of attribute types;
for the at least a first attribute type, determining a third plurality of data object instances, selected from the second plurality of data object instances, having a data value change for the at least a first attribute type where the data value change is to a common attribute value;
for the third plurality of data object instances, determining a plurality of scope attributes defined for the plurality of attribute types of the data object type;
retrieving values for the plurality of scope attributes from the third plurality of data object instances;
for respective scope attributes of the plurality of scope attributes, determining a most common value from the retrieved values for the plurality of scope attributes;
for respective scope attributes of the plurality of scope attributes, determining an occurrence frequency of a respective most common value for a respective scope attribute;
for scope attributes of the plurality of scope attributes satisfying a threshold occurrence frequency, constructing a plurality of association rules, wherein one or more scope attributes satisfying the threshold occurrence frequency are present in a respective association rule as rule antecedents, and the common attribute value of the at a first attribute type is present in the respective association rule as a consequent; and
verifying the plurality of association rules using a fourth plurality of data object instances, which can include at least a portion of the first plurality of data object instances or the second plurality of data object instances.

10. The computing system of claim 9, wherein the operations are carried out automatically.

11. The computing system of claim 9, wherein the operations are carried out automatically, periodically according to a defined setting.

12. The computing system of claim 11, wherein the operations are carried out automatically in response to detection of a defined event type.

13. The computing system of claim 11, the operations further comprising:
receiving user input designating that at least one of the plurality of association rules should be implemented to process instances of the data object type.

14. The computing system of claim 11, wherein only attributes present in the change log are used as consequents in the plurality of association rules.

15. One or more computer readable storage media comprising:
computer executable instructions that, when executed by a computing system comprising at least one hardware processor and at least one memory coupled to the at least one hardware processor, cause the computing system to receive respective changes to one or more attributes of a first plurality of data objects of a second plurality of data objects, wherein the first plurality of data objects is the second plurality of data objects or is less than all of the second plurality of data objects;
computer executable instructions that, when executed by the computing system, cause the computing system to update the first plurality of data objects with the respective changes;
computer executable instructions that, when executed by the computing system, cause the computing system to log the respective changes in a change log;
computer executable instructions that, when executed by the computing system, cause the computing system to retrieve a first plurality of attributes associated with the first plurality of data objects, the first plurality of data objects having a first type, data objects of the first plurality of data objects comprising multiple attributes, at least a portion of the multiple attributes being in the first plurality of attributes at least one attribute of the first plurality of attributes being associated with a common identifier among the first plurality of data objects and data objects of the first plurality of the data objects comprising a respective value for the at least one attribute;
computer executable instructions that, when executed by the computing system, cause the computing system to, based at least in part on the change log, determine a first data object of the first plurality of data objects where an attribute value was changed to a first value for a first attribute;
computer executable instructions that, when executed by the computing system, cause the computing system to determine the common identifier of the first attribute;
computer executable instructions that, when executed by the computing system, cause the computing system to determine a second data object of the first plurality of data objects where a value associated with the first attribute was changed to the first value;
computer executable instructions that, when executed by the computing system, cause the computing system to determine an identifier of at least a second attribute associated with the first data object and the second data object;
computer executable instructions that, when executed by the computing system, cause the computing system to retrieve a second value for the at least a second attribute associated with the first data object and a third value for the at least a second attribute associated with the second data object;

computer executable instructions that, when executed by the computing system, cause the computing system to construct at least a first association rule, the at least a first association rule comprising the common identifier of the first attribute and the first value as a consequent and the identifier of the at least a second attribute and the second value or the third value as an antecedent;

computer executable instructions that, when executed by the computing system, cause the computing system to evaluate the at least a first association rule using a second plurality of data objects of the first type, which can include at least a portion of the first plurality of data objects, to provide at least a first evaluation metric value for at least a first evaluation metric;

computer executable instructions that, when executed by the computing system, cause the computing system to compare the at least a first evaluation metric value with at least a first threshold defined for the at least a first evaluation metric;

computer executable instructions that, when executed by the computing system, cause the computing system to determine that the at least a first evaluation metric value satisfies the at least a first threshold;

computer executable instructions that, when executed by the computing system, cause the computing system to implement the at least a first association rule;

computer executable instructions that, when executed by the computing system, cause the computing system to receive first data input for a data object of the first type;

computer executable instructions that, when executed by the computing system, cause the computing system to process the first data input using the at least a first association rule; and (1) wherein the first data input comprises stored data for one or more data objects of the first type and the computer executable instructions that cause processing the first data input using the at least a first association rule comprise computer executable instructions that, when executed by the computing system, cause the computing system to change attribute values of the first attribute in at least a portion of the stored data to the first value; or (2) wherein the computing executable instructions that cause processing the first data input using the at least a first association rule comprise:

computer executable instructions that, when executed by the computing system, cause the computing system to receive the first data input as user input;

computer executable instructions that, when executed by the computing system, cause the computing system to determine that the first data input includes a fourth value for the first attribute that is not the first value; and computer executable instructions that, when executed by the computing system, cause the computing system to provide an indication to a user that the fourth value may be incorrect; or (3) computer executable instructions that, when executed by the computing system, cause the computing system to determine a fourth value for the at least a second attribute, the fourth value being a most common value associated with data objects of the first plurality of data objects having a first attribute value changed to the first value; or (4) computer executable instructions that, when executed by the computing system, cause the computing system to receive user input defining one or more scope attributes; and determine that the at least a second attribute is a scope attribute of the defined one or more scope attributes and wherein the retrieving a second value is carried out in response to determining that the at least a second attribute is a scope attribute.

16. The one or more computer readable storage media of claim 15, comprising (1).

17. The one or more computer readable storage media of claim 15, comprising (2).

18. The one or more computer readable storage media of claim 15, comprising (3).

19. The one or more computer readable storage media of claim 15, comprising (4).

20. The one or more computer readable storage media of claim 15, wherein the computer executable instructions that cause the computing system to determine a first data object of the first plurality of data objects where an attribute value was changed to a first value for a first attribute comprise computer executable instructions that, when executed by the computing system, cause the computing system to evaluate the change log.

* * * * *